United States Patent [19]

Cannon

[11] Patent Number: 5,449,067

[45] Date of Patent: Sep. 12, 1995

[54] EXTENSION CORD CADDY

[76] Inventor: Robert K. Cannon, 1629 Gunter Ave., Guntersville, Ala. 35976

[21] Appl. No.: 372,399

[22] Filed: Jan. 13, 1995

[51] Int. Cl.⁶ ............................................. B65D 85/04
[52] U.S. Cl. .................................. 206/702; 174/135; 206/388
[58] Field of Search ............... 206/328, 329, 334, 388, 206/408; 174/135

[56] References Cited

U.S. PATENT DOCUMENTS

| | | | |
|---|---|---|---|
| 2,449,464 | 9/1948 | Eypper | 174/135 |
| 2,763,707 | 9/1956 | Soderberg | 206/328 |
| 2,834,078 | 5/1958 | Brundage . | |
| 3,337,682 | 8/1967 | Swett . | |
| 3,612,426 | 10/1970 | Germock, Jr. . | |
| 4,410,084 | 10/1983 | Ladner . | |
| 4,467,979 | 8/1984 | Koehler . | |
| 4,979,614 | 12/1990 | Ruhaut | 206/328 |
| 4,984,685 | 1/1991 | Douglas . | |

Primary Examiner—Jimmy G. Foster
Attorney, Agent, or Firm—Richard C. Litman

[57] ABSTRACT

A cord caddy for storing and removing electrical extension cords. The cord caddy is an opened top container which includes a bottom with sidewalls extending upwardly from the bottom to terminate in a open upper end. The sidewall includes three adjacent orifices in the lower wall portion and two adjacent orifices in the upper wall portion. A first portion of an extension cord having a first receptacle end is pulled through one of the lower orifices. The first portion or pig tail is then pulled through the other lower orifices to secure the pig tail outside the container. The remainder of the cord is packed in the container hand over hand. The second receptacle end of the cord is then secured through the upper orifices.

11 Claims, 3 Drawing Sheets

EXTENSION CORD CADDY

BACKGROUND OF THE INVENTION

1. FIELD OF THE INVENTION

The present invention relates to a portable container for storing and using an electrical extension cord or other elongated element.

2. DESCRIPTION OF THE PRIOR ART

Anyone that has ever used an electrical extension cord in lengths of twenty-five feet, fifty feet, or other substantial length understands the difficulty, not only in unwinding the cord in use, but also in rewinding the cord for storage purposes. Because such cords are difficult to keep under control, the receptacle ends of the cords become easily entangled within the length of the cord. In some instances, workers have become so disenchanted with a tangled cord that they have simply thrown the cords away, rather than take the time and trouble to untangle the cord.

Even when the cord does not become tangled, workers spend a considerable amount of time unwinding and rewinding the cords. In addition, workers typically have no convenient place to store cords, either on the job site or in their trucks/vehicles. As can be easily imagined, winding a cord and placing it either on the floor of a job site subjects the cord to unwinding, either from movement or from other workmen. Further, there is no assurance that such cords will not become entangled with other products or articles on the floor or job site.

Prior art devices have addressed these problems, but have typically resorted to devices using reels or other devices of varying complexity.

U.S. Pat. No. 2,834,078, issued to Helen S. Brundage on May 13, 1958, discloses a Cord Storage Device which includes a spool and a outer housing between which a length of cord may be stored.

U.S. Pat. No. 3,337,682, issued to James B. Swett on Aug. 22, 1967, discloses a Cord Caddy which includes a container having a bottom wall and a upwardly longitudinally directed side walls that terminate in a peripheral rim. U-shaped cut-outs are disposed in the side walls and interrupt the continuity of the rim.

U.S. Pat. No. 3,612,426, issued to John Germock, Jr. on Oct. 12, 1971, discloses a Extension Cord Caddy which includes a baseplate, a substantially flat coiling form having a base portion and having arms extending at angles from the base portion, and a clamping member which pivotally secures the coiling form to the baseplate.

U.S. Pat. No. 4,410,084, issued to Charles R. Ladner on Oct. 18, 1983, discloses a Water Ski Rope Storage Compartment which includes a base and a lid connected by a hinge. A spool is rigidly secured to the base and extends outwardly from the base. The lid encloses the spool when the compartment of the '084 patent is closed.

U.S. Pat. No. 4,467,979, issued to Rudolph A. Koehler on Aug. 28, 1984, discloses a Cord Reel which includes a housing, a reel mounted for rotation within the housing, and a cord wound on the reel for storage. The device of the '979 patent includes a first means for rendering the cord inoperative when either more than or less than a predetermined amount of cord is would on the reel. A second means is interconnected with the first means to prevent the cord from being wound on the reel whenever the cord is inoperative.

U.S. Pat. No. 4,984,685, issued to Frank A. Douglas on Jan. 15, 1991, discloses a Portable Container for Elongated Elements which includes and open upper end, an inner shaft within the container about which a cord is wrapped, and a lid covering the open upper end. The lid includes at least one opening which cooperates with the inner shaft to enable the cord to be inserted into the container and wrapped around the inner shaft or removed from the container while being unwound from the inner shaft.

None of the above inventions and patents, taken either singly or in combination, is seen to describe the instant invention as claimed.

SUMMARY OF THE INVENTION

The cord caddy of the present invention includes an open topped container which includes a bottom with sidewalls extending upwardly from the bottom to terminate in an open upper end. The sidewall includes three adjacent orifices in the lower wall portion and two adjacent orifices in the upper wall portion. A first portion of an extension cord with a first receptacle end is pulled through one of the lower orifices. The first portion or pigtail is then pulled through the other lower orifices to secure the pigtail outside the container. The remainder of the cord is packed in the container hand over hand. The second receptacle end of the cord is then secured through the upper orifices.

The cord caddy eliminates the need for any time consuming winding or unwinding of the extension cord. In addition, the caddy prevents cords from becoming tangled and at the same time provides a convenient storage place for the cord at work sites.

Accordingly, it is a principal object of the invention to provide a cord storage device which eliminates the need to unwind and rewind extension cords.

It is another object of the invention to provide a portable storage device for convenient storage of an electrical extension cord at the work site as well as at home.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
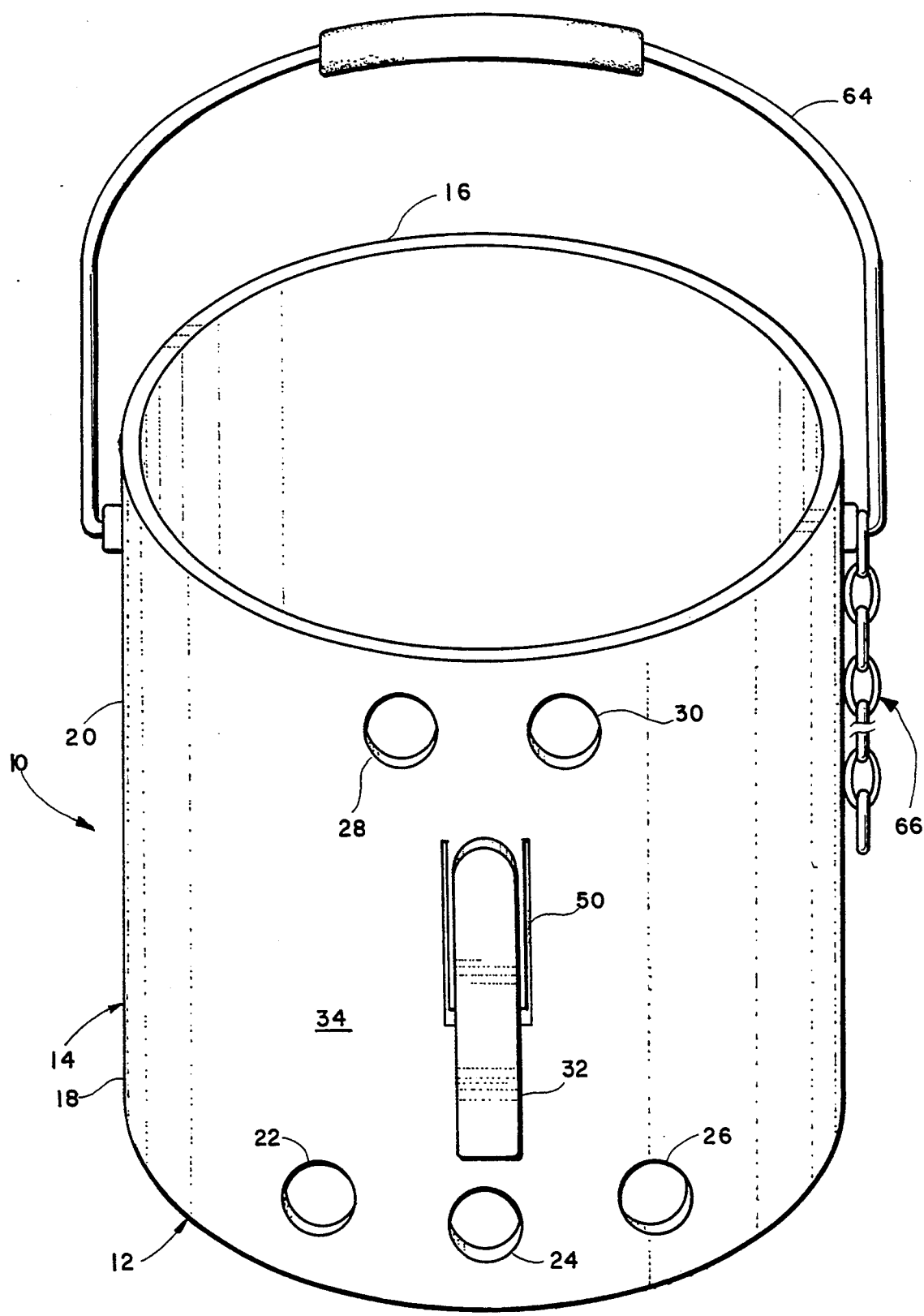
FIG. 1 is perspective view of the extension cord caddy of the present invention.

The following detailed description illustrates the invention by way of example and not by way of limitation. In the drawings, an electric extension cord is illustrated. This is, however, representative of any one of a number of elongated elements that may be used with the portable container or caddy of the present invention.

It is to be further understood that the present invention is not to be limited by the design, shape, or size of the caddy, whether manufactured in one or more part, as will become apparent below.

Referring now to the drawings, and in particular FIG. 1, it will be seen that the extension cord caddy 10 of the present invention includes an open top container, such as a plastic bucket, having a bottom 12 and a peripherally continuous sidewall 14 extending upwardly from the bottom 12 to terminate in an open upper end 16.

The sidewall 14 includes a lower wall portion 18 adjacent the bottom 12 and a upper wall portion 20 adjacent the open upper end 16. A first lower orifice 22, a second lower orifice 24, and a third lower orifice 26 extend through the lower wall portion 18. A first upper orifice 28 and a second upper orifice 30 extend through the upper wall portion 20. All of these orifices 22,24,26,28,30 are sized to allow through passage of an extension cord and an associated cord plug. All of the orifices may be located on a common side of the caddy 10 to facilitate easy transport of the caddy 10.

The caddy 10 also includes a plurality of L-shaped cord retaining members 32 attached to an outside surface 34 of the caddy 10. One such L-shaped member 32 is shown attached in FIG. 1 and FIG. 2. As shown in FIG. 3, each of the plurality of L-shaped members 32 includes a base 36, a horizontal leg 38 extending laterally from the base 36, and a vertical member 40 extending upwardly from the horizontal leg 38. The base 36 includes a first groove 42 extending vertically along a first side 44 and a second groove 46 extending vertically along an opposing second side 48.

Figure 5:
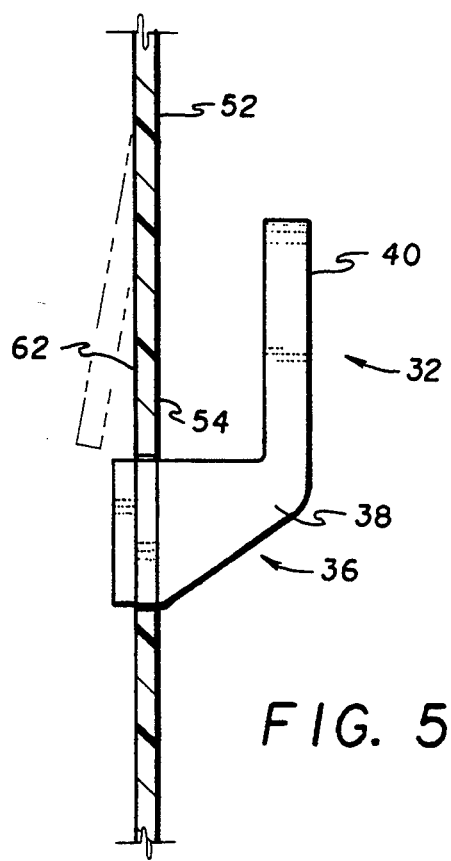
FIG. 5 is a detail side elevational view of the cord retaining member secured within a slot of the cord caddy.
Figure 4:
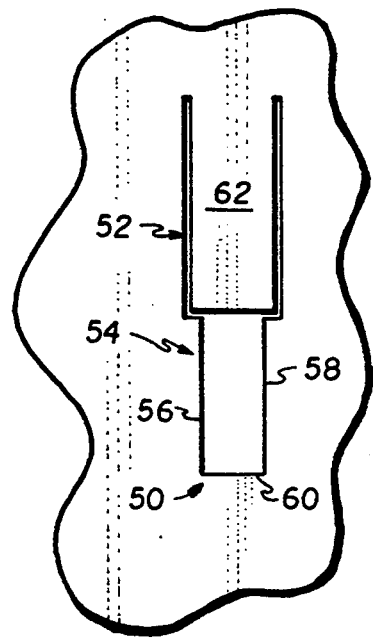
FIG. 4 is a detail view of a slot of the cord caddy with the cord retaining member removed.

To accommodate removable attachment of the L-shaped members 32, the sidewall 14 includes a plurality of slots 50 extending through the sidewall 14. One such slot 50 is shown in FIG. 1 and FIG. 4. Each slot 50 includes a slot upper portion 52 and a slot lower portion 54. The slot upper portion 52 is dimensioned to accept the base portion 36. The slot lower portion 54 is defined by a slot first side edge 56, an opposing slot second side edge 58, and a slot bottom edge 60. The slot first side edge 56 and slot second side edge 58 slidably engage the first groove 42 and second groove 48 respectively of the L-shaped member 32. Each slot 50 includes a flap 62 pivotally connected to the slot upper portion 52 and extending downwardly therefrom. As can be appreciated from FIG. 5, member 32 is inserted into place by deflecting flap 62 slightly, as shown in phantom lines in FIG. 5, whereupon member 32 is slid downwardly into position. Then flap 62 returns to its normal position, co-planar with the sidewall 14. The flap 62 acts as a keeper or retainer, against the base 36, to prevent unintended or accidental removal of member 32 from the portion 54 of slot 50.

The caddy 10 also includes a handle 64 attached to the open upper end 16 of the sidewall 14. A chain member 66 having a first end 68 and a second end 70 is attached to the handle 64. The first end 68 is fixedly attached to the handle 64 while the second end 70 is removably attached to the handle 64 using conventional methods well known in the art. A lid 72, as shown in FIG. 2, may be removably mounted on the open upper end 16 of the sidewall 14 for closure of the caddy 10.

Figure 2:
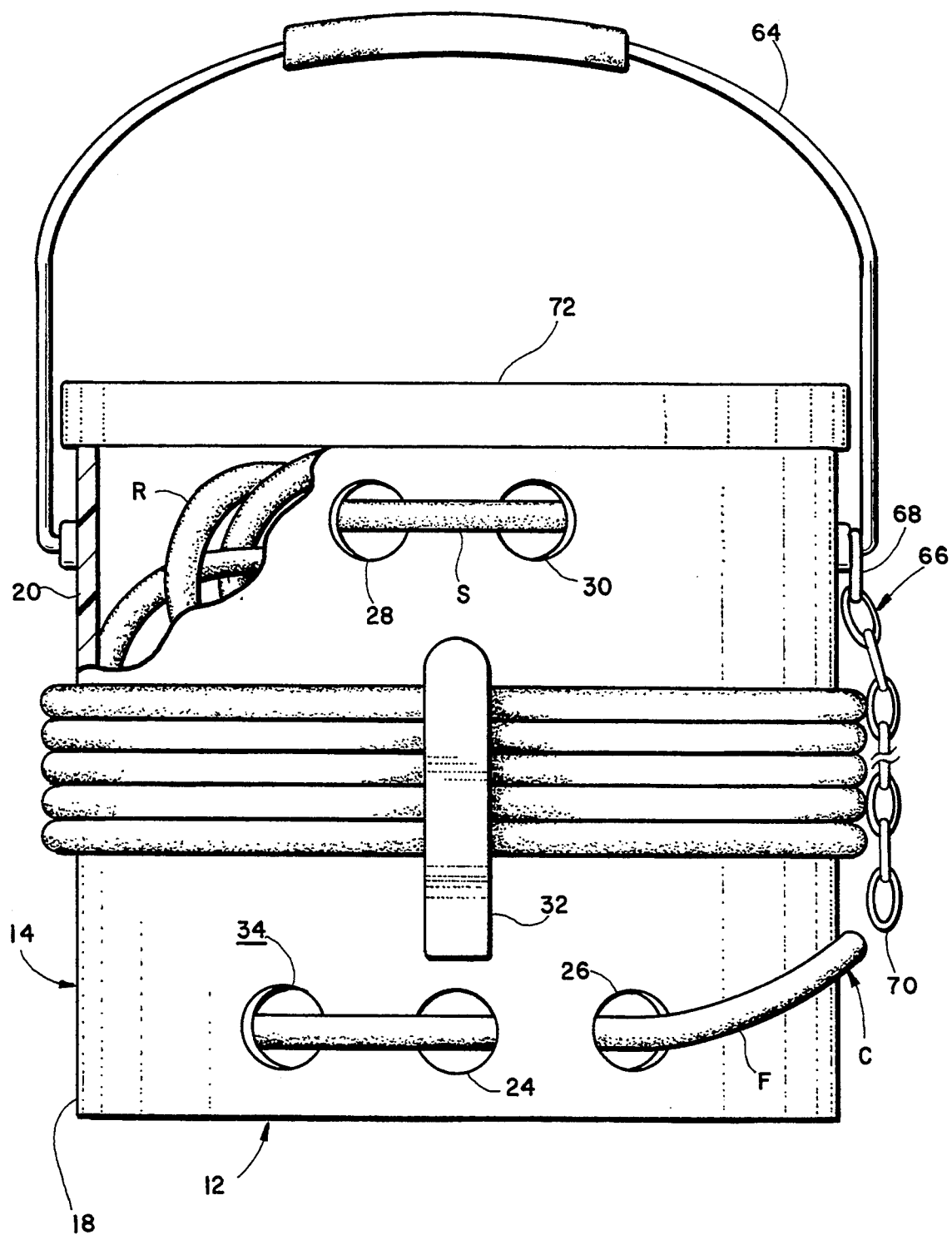
FIG. 2 is a front elevational view of the present invention in partial section showing the caddy with a portion of the extension cord within the caddy and a portion of extension cord coiled around the caddy.
Figure 3:
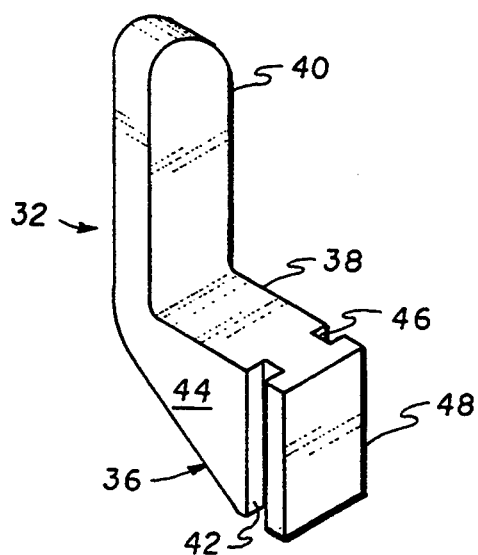
FIG. 3 is a detail perspective view showing a cord retaining member associated with the cord caddy of the present invention.

As shown in FIG. 2, for storage purposes a predetermined portion of an extension cord C having an attached receptacle (not shown) at a first end F is inserted into the caddy 10 and pulled through the first lower orifice 22. This length of cord C, or pigtail, is fixed by running the receptacle and cord back into the caddy 10 through the second lower orifice 24. The receptacle and cord are then pulled tightly through the third lower orifice 26. Frictionally engagement between the tensed cord and the sidewall near the orifices serve to hold the pig tail firmly in place. The pigtail may then be coiled around the outside surface 34 of the caddy 10. The length of the pigtail may be increased by attachment of additional extension cords to the pigtail. The L-shaped members 32 retain and support the coiled pigtail.

As shown in FIG. 2, the remaining portion R of the cord not pulled through the lower orifices 22,24,26 may be packed within the caddy 10 hand over hand. Once the remaining portion has been packed within the caddy 10, the second end S of the cord with its attached receptacle may be pulled out of the caddy through the first upper orifice 28 and back into the caddy through the second upper orifice 30 to secure the second end S.

In use, the user removes the secured second end S of the cord from the upper orifices 28,30 and connects the second end S to an electrical tool. To extend the length of cord needed, the user simply pulls the remaining portion R of the cord from the caddy interior. The chain 66 attached to the handle 64 may be secured around a stationary structure to maintain the caddy in an upright position as cord is pulled from the caddy. The pigtail portion is connected to a power supply to provide electricity to the tool connected to the cord.

It is noted that all of the orifices through which an electrical plug (male or female) will pass are each appropriately dimensioned, not only to accept an original equipment plug, which is about 1⅛" in diameter, but also a larger diameter replacement plug, which may be about 1⅜" in diameter or so; ordinarily, replacement plugs are larger than original equipment plugs.

It is to be understood that the present invention is not limited to the sole embodiment described above, but encompasses any and all embodiments within the scope of the following claims.

What is claimed is:

1. An extension cord caddy comprising:
   a bottom;
   a peripherally continuous sidewall extending upwardly from said bottom to terminate in an open upper end, said sidewall having a lower wall portion adjacent said bottom and a upper wall portion adjacent said open upper end,
   said lower wall portion having a first lower orifice extending through said lower wall portion, a second lower orifice extending through said lower wall portion adjacent said first lower orifice, and a third lower orifice extending through said lower wall portion adjacent said second orifice, with each of said first lower orifice, said second lower orifice, and said third lower orifice dimensioned for through passage of an extension cord plug, and
   said upper wall portion having a first upper orifice extending through said upper wall portion and a second upper orifice extending through said upper wall portion, said second upper orifice adjacent said first upper orifice, with said first upper orifice and said second upper orifice each dimensioned for through passage of the extension cord plug.

2. The extension cord caddy according to claim 1, wherein said first lower orifice, said second lower orifice, said third lower orifice, said first upper orifice, and said second upper orifice are all located on a common side of said extension cord caddy.

3. The extension cord caddy according to claim 2, including a cord retaining member attached to an outside surface of said sidewall.

4. The extension cord caddy according to claim 1, including a cord retaining member attached to an outside surface of said sidewall.

5. The extension cord caddy according to claim 4, wherein said cord retaining member includes an L-shaped member having a base attached to said outside surface of said sidewall, a horizontal leg extending laterally from said base, and a vertical member extending upwardly from said horizontal leg.

6. The extension cord caddy according to claim 5, wherein said sidewall includes a slot extending through said sidewall, said slot having a slot upper portion and a slot lower portion, said slot upper portion dimensioned to accept said base of said L-shaped member, said slot lower portion defined by a slot first side edge, an opposing slot second side edge, and a slot bottom edge, and said L-shaped member is removably disposed in said slot, with said base including a first groove extending vertically along a first side and a second groove extending vertically along an opposing second side, with said slot first side edge slidably engaging said first groove, said slot second side edge slidably engaging said second groove, and said base supported by said slot bottom edge.

7. The extension cord caddy according to claim 6, wherein said slot includes a flap member pivotally connected to said upper portion of said slot and extending downwardly therefrom, said flap located above said base of said L-shaped members thus to retain said L-shaped member in place.

8. The extension cord caddy according to claim 7 including a handle attached to said open upper end of said sidewall.

9. The extension cord caddy according to claim 8 including a chain member having a first end and a second end, with said first end fixedly attached to said handle, and said second end removably attached to said handle.

10. The extension cord caddy according to claim 9, including a lid removably mounted on said open upper end of said sidewall.

11. An extension cord caddy comprising:
a bottom;
a peripherally continuous sidewall extending upwardly from said bottom to terminate in an open upper end, said sidewall having a lower wall portion adjacent said bottom and a upper wall portion adjacent said open upper end, said lower wall portion having a first lower orifice extending through said lower wall portion, a second lower orifice extending through said lower wall portion adjacent said first lower orifice, and a third lower orifice extending through said lower wall portion adjacent said second orifice, with each of said first lower orifice, said second lower orifice, and said third lower orifice dimensioned for through passage of an extension cord plug, said upper wall portion having a first upper orifice extending through said upper wall portion and a second upper orifice extending through said upper wall portion, said second upper orifice adjacent said first upper orifice, with said first upper orifice and said second upper orifice each dimensioned for through passage of the extension cord plug, said first lower orifice, said second lower orifice, said third lower orifice, said first upper orifice, and said second upper orifice located on a common side of said extension cord caddy;

a plurality of L-shaped members, each of said plurality of L-shaped member including a base, a horizontal leg extending laterally from said base, and a vertical member extending upwardly from said horizontal leg, said base including a first groove extending vertically along a first side and a second groove extending vertically along an opposing second side, said sidewall including a plurality of slots extending through said sidewall, each of said plurality of slots including a slot upper portion and a slot lower portion, said slot upper portion dimensioned to accept said base portion of said each of said plurality of L-shaped member, said slot lower portion defined by a slot first side edge, an opposing slot second side edge, and a slot bottom edge, with said slot first side edge slidably engaging said first groove, said slot second side edge slidably engaging said second groove, and said base supported by said slot bottom edge, said each of said plurality of slots including a flap pivotally connected to said slot upper portion and extending downwardly therefrom, said flap located above said base of said L-shaped member, thus to retain said L-shaped member in place, a handle attached to said open upper end of said sidewall;

a chain member having a first end and a second end, with said first end fixedly attached to said handle, and said second end removably attached to said handle; and a lid removably mounted on said open upper end of said sidewall.

* * * * *